United States Patent [19]

Meckel et al.

[11] Patent Number: 5,143,995

[45] Date of Patent: Sep. 1, 1992

[54] ADHESIVES BASED ON POLYOLS AND POLYISOCYANATES

[75] Inventors: Walter Meckel, Neuss; Eduard Hänsel, Wuppertal; Otto Ganster, Odenthal; Günter Arend, Dormagen; Jörg Büchner, Bergisch Gladbach, all of Fed. Rep. of Germany

[73] Assignee: Bayer Aktiengesellschaft, Leverkusen, Fed. Rep. of Germany

[21] Appl. No.: 722,715

[22] Filed: Jun. 27, 1991

[30] Foreign Application Priority Data

Jul. 3, 1990 [DE] Fed. Rep. of Germany ....... 4021113

[51] Int. Cl.$^5$ ............................................. C08G 18/10
[52] U.S. Cl. ......................................... 528/59; 528/76; 528/77; 528/80; 528/81; 528/83; 528/85
[58] Field of Search ....................... 528/59, 76, 77, 80, 528/81, 83, 85

[56] References Cited

U.S. PATENT DOCUMENTS

| | | | |
|---|---|---|---|
| 3,373,143 | 3/1968 | Chilvers et al. | 260/75 |
| 3,657,057 | 4/1972 | Shorr et al. | 161/2 |
| 3,895,043 | 7/1975 | Wagner et al. | 260/448.8 R |
| 3,931,116 | 1/1976 | Bernstein et al. | 260/77.5 R |
| 4,137,276 | 1/1979 | Sirota | 260/830 P |
| 4,652,494 | 3/1987 | Bravet et al. | 428/423.1 |
| 4,671,838 | 6/1987 | Bravet et al. | 156/246 |
| 4,784,916 | 11/1988 | Bravet et al. | 428/423.1 |
| 4,891,271 | 1/1990 | Bravet et al. | 428/423.1 |
| 4,935,486 | 6/1990 | Wellner | 528/67 |

*Primary Examiner*—Maurice J. Welsh
*Attorney, Agent, or Firm*—Joseph C. Gil; Godfried R. Akorli

[57] ABSTRACT

Disclosed herein is a transparent adhesive containing isocyanate groups based on at least one polyol and at least one polyisocyanate, characterized in that the adhesive contains urea groups.

10 Claims, No Drawings

ADHESIVES BASED ON POLYOLS AND POLYISOCYANATES

BACKGROUND OF THE INVENTION

This invention relates to transparent adhesives containing isocyanate groups and to their use for the production of composite films.

The production of composite films for the packaging industry is assuming increasing proportions because composite films can be built to have made-to-measure properties by combining various films. Polyurethanes are the chosen adhesives because they guarantee firm adhesion of the films to one another, are odorless and, by virtue of their transparency, and do not adversely affect the appearance of the goods to be packed. Whereas, in the past, the majority of adhesives were applied from solution, the trend is now towards low-solvent systems (cf. DE-A-3,431,688) and solventless systems (cf. for example DE-A 2,549,227 and 3,815,242). The weak points of these new systems are, in particular, the relatively poor initial adhesion which can cause problems, especially in the high-speed processing of composites. In addition, composites in which aluminum is one of the film materials to be bonded show poor strength values, particularly when they are subsequently subjected to sterilization with steam.

Numerous possibilities for improving the adhesion of aluminum composites have already been proposed (cf. EPA-349,838, DE-A-2,857,281 and 3,529,176), all being distinguished by the fact that additives, such as for example silanes, epoxides, phosphoric acid and/or anhydrides, are added.

Polyurethanes containing urea groups for adhesive applications are not new, but hitherto, they could only be produced in solution by reaction of an isocyanate prepolymer with an excess of a polyamine (U.S. Pat. No. 3,931,116) or bis-ketimine (U.S Pat. No. 4,137,276).

On the account of the instability of ester bonds in the presence of amino groups, storable products can only be obtained by this process if polyethers are used. On account of their high reactivity, the products containing amino groups can only be further reacted with polyepoxides and not with polyisocyanates.

Polyurethane urea solutions which are stable in the absence of moisture can be obtained by reaction of a polyisocyanate prepolymer with aminosilanes to form terminal trialkoxysilane groups (DE-A-2,155,258) which rapidly crosslink, under the effect of water.

Apart from the large amounts of solvent required for stabilization, it is the sensitivity to water which is an obstacle to practical application of these polyurethane urea solutions.

DE-A 3,815,237 relates to a process for the production of low-monomer polyisocyanates by selective reduction of the modified polyisocyanate content by addition of water wherein the products obtained are used for coating purposes.

On account of the basically already low monomer contents of the polyisocyanates, the reaction with water gives polyisocyanate urea products having a very low content of urea segments from which no adhesion-promoting effect can be expected.

The problem addressed by the present invention was to provide adhesives, more particularly, adhesives for composite films having improved strength and, in particular, initial strength.

SUMMARY OF THE INVENTION

The present invention relates to transparent adhesives containing isocyanate groups based on at least one polyol and at least one polyisocyanate, characterized in that the adhesive contains urea groups corresponding to the following formula

in which
X and Y may be the same or different and represent NCO and/or Z—CO—NH—, X and Y being attached to R and R' via the N atom of the NH group,
Z represents O, S, NH,
R and R' may be the same or different and represent the residue of a polyisocyanate containing at least two NCO groups of different reactivity after removal of the two NCO groups.

In the context of the invention, a polyisocyanate containing two NCO groups of different reactivity is, particularly, understood to be an asymmetrically substituted diisocyanate, and more particularly diisocyanates in which one isocyanate group shows reduced reactivity in relation to the other through electronic and/or preferably steric effects is understood to be asymmetrically substituted.

Preferred polyols are polyesters, polyethers and polyether esters containing hydroxyl groups. In one preferred embodiment, the adhesive contains 0.15 to 4.0% by weight and preferably 0.3 to 3% by weight —NH—CO—NH-groups, based on the adhesive. Preferred groups R and R' are aryl, alkyl, cycloalkyl and aralkyl groups which may optionally be substituted, more particularly by alkyl groups, such as for example methyl groups.

In one preferred embodiment, the substituents X and Y represent an isocyanate and/or urethane group.

In one particularly preferred embodiment, R and R' have the same meaning and represent structural elements corresponding to the following formula

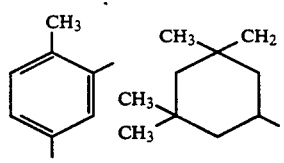

The adhesives are preferably one-component adhesives based on isocyanate prepolymers containing 1 to 6 and preferably 1.5 to 3.5% by weight isocyanate groups or two component adhesives based on hydroxyl polyols having a hydroxyl value of 30 to 300 and preferably 50 to 150 and isocyanate prepolymers containing 3 to 25% by weight and preferably 3.5 to 18% by weight isocyanate groups in such a mixture that the ratio of the isocyanate groups of the isocyanate prepolymer to the hydroxyl groups of the polyol component is between 1.05:1 and 3.0:1 and preferably between 1.1:1 and 2.0:1.

In general, at least one of the components has such a content of urea groups that the mixture contains 0.15 to 4.0% by weight and preferably 0.3 to 3.0% by weight urea groups.

DETAILED DESCRIPTION OF THE INVENTION

The polyols or polyisocyanates containing urea groups are produced by reaction of polyisocyanates containing isocyanate groups of different reactivity with water, in the presence of polyols and preferably in the presence of bifunctional polyols, in such a quantity that, preferably, only the more reactive isocyanate groups react off with urea formation so that the less reactive isocyanate groups are available for further reaction.

The reaction with water takes place at temperatures of 10° to 120° C., preferably at temperatures of 50° to 100° C. and more preferably at temperatures of 80° to 95° C.

The resulting isocyanate prepolymers containing 1 to 25% by weight isocyanate groups may be used as polyisocyanates containing urea groups either as such, or after mixing with polyisocyanates and/or polyisocyanate adducts and/or reaction with a subequivalent quantity of polyols, preferably bifunctional hydroxyl groups or are reacted with an excess of polyols, preferably bifunctional hydroxyl compounds to form polyols containing urea groups which may be used either as such or after mixing with polyols.

The polyols containing urea groups may of course be reacted with an excess of polyisocyanates to form polyisocyanates containing urea groups.

Another method of introducing urea groups is to use relatively long-chain aminopolyethers and/or aminopolyesters, for example, of the type obtained in accordance with DE-A-2,948,419 or 3,403,498. The molecular weight of the aminopolyethers or aminopolyesters, preferably the bifunctional amino compounds should be in the range from 800 to 3,500 and is preferably in the range from 1,000 to 2,500.

The average functionality of approximately 2.05 to 2.7 required for optimal adhesion of the composites can be established in particular using polyisocyanates having a functionality of more than 2 as a mixing component for the polyisocyanates containing urea groups and polyols of higher functionality as a mixing component for the polyols containing urea groups.

Particularly preferred embodiments for the production of the polyols containing urea groups and prepolymers containing isocyanate groups are the following.

Production of Polyols Containing Urea Groups

The asymmetrically substituted polyisocyanate, and preferably the bifunctional polyisocyanate is reacted with 0.1 to 0.7 mol and preferably with 0.2 to 0.5 mol water per mol polyisocyanate in the presence of a polyol and preferably bifunctional polyols in a quantity of 0.02 to 0.5 mol per mol isocyanate at temperatures of 10° to 120° C., preferably at temperatures of 50° to 100° C. and more preferably at temperatures of 80° to 95° C. The progress of the reaction may be followed, for example, titrimetrically via the content of isocyanate groups or volumetrically via the quantity of carbon dioxide given off. After the desired conversion has been reached, an excess of the polyol and preferably bifunctional polyol is added and reacted off. When the mixture is largely isocyanate-free, the product may be packed in containers or mixed with polyols.

Production of Polyisocyanates Containing Urea Groups 1 mol of an asymmetrical polyisocyanate and preferably bifunctional polyisocyanate is mixed with 0.2 to 0.7 mol and preferably with 0.25 to 0.6 mol of a polyol and preferably bifunctional polyol and the resulting mixture is reacted in the presence of 0.1 to 0.7 mol water and preferably in the presence of 0.2 to 0.4 mol water at temperatures in the range from 20° to 110° C. and preferably at temperatures in the range from 50° to 95° C.

In one particularly preferred embodiment, a prepolymer containing isocyanate groups is produced from the polyisocyanate and the polyol before addition of the water. The water is only added and reacted after a constant isocyanate content has been reached. The isocyanate prepolymers containing urea groups thus obtained are distinguished by a greatly reduced content of monomeric polyisocyanates and, accordingly, represent particularly valuable units for the production of adhesives.

All isocyanate prepolymers may of course be mixed with other polyisocyanates after the reaction with water.

They may be used as such as moisture-curing one-component adhesives or as polyisocyanates for two-component adhesives.

Units for the polyols and/or polyisocyanates containing urea groups to be synthesized in accordance with the invention are asymmetrically substituted polyisocyanates, such as for example alkyl benzene diisocyanates, in which one isocyanate group is in the ortho position to the alkyl group, preferably 2,4-tolylene diisocyanate, diphenyl methane diisocyanates containing at least 40% of the 2,4'-isomer, diphenyl methane diisocyanates containing an alkyl group in the ortho position to an isocyanate group (for example DE-A-2,935,318), polyisocyanates containing an aromatically bound and aliphatically bound isocyanate group (cf DE-A 3,402,623, 3,245,320, 3,245,321) or 1-isocyanatomethyl-3-isocyanato-1,5,5-trimethyl cyclohexane (IPDI). Particularly preferred diisocyanates are 2,4-tolylene diisocyanate and IPDI.

Bifunctional polyesters, polyethers and/or polyether esters having a molecular weight of 500 to 6,000 and preferably 700 to 3,000 are preferably used in addition to the polyisocyanates, being obtained in known manner from aliphatic and/or aromatic dicarboxylic acids, such as for example adipic acid and/or ortho-, iso- and/or terephthalic acid and glycols, such as ethylene, 1,2-propylene, 1,4-butylene and/or 1,6-hexylene glycol or even diethylene glycol, neopentyl glycol and/or 1,4-cyclohexane dimethanol by melt condensation. Hydroxyl polyesters of carbonic acid and/or 5-hydroxycaproic acid may also be mentioned in this regard.

The hydroxyl polyether polyols are obtained in known manner by addition of ethylene and/or propylene oxide with predominantly bifunctional starters, such as for example water, ethylene glycol, propylene glycol or bisphenol A.

Polytetramethylene ether glycols may also be used. The molecular weights of the polyether polyols may also be varied within wide limits, a molecular weight in the range from 600 to 3,000 being preferred. Polyether esters of the type obtained by reaction of the above-mentioned compounds from the class of dicarboxylic acids, glycols and polyether glycols (cf DOS 3,437,915) may also be used.

If particularly low viscosities are required, polyether polyols and polyether ester polyols are particularly preferred. Since the polyols or polyisocyanates containing urea groups may be subsequently mixed and combined with polyols or polyisocyanates, hydroxyl polyesters, polyethers and polyether polyesters of higher functionality, which may be obtained in known manner by using trimethylol propane or glycerol for example, may of course be added to the list of polyols. It is also possible to add monomeric glycols and/or triols, such as for example diethylene glycol or triisopropanolamine, or even fatty acid derivatives, such as castor oil for example.

Diols containing ions and/or units forming ionic groups, such as for example dimethylol propionic acid, N-methyl diethanolamine and/or reaction products of sodium bisulfite and propoxylated butene-1,4-diol, may of course also be used for particular effects.

The list of polyisocyanates may be extended, in particular, by hexamethylene diisocyanate with its biurets and trimers, 4,4'-diphenyl methane diisocyanate and hydrogenation products thereof and by polyisocyanates derived from tolylene diisocyanate or IPDI by trimerization and/or urethanization with, for example, trimethylol propane, to mention only a few preferred candidates.

The systems mentioned are preferably used in solventless form, although they may also be diluted with such solvents as, for example, ethyl acetate, acetone or methyl ethyl ketone. The systems processable as one-component systems may be used as such, the moisture in the films normally being sufficient for curing. However, the adhesive may even be additionally sprayed with moisture and catalysts after application to guarantee faster curing. Application with solvents is possible.

The systems to be processed as two-component systems are preferably mixed in such a ratio that the ratio of the isocyanate groups in the polyisocyanate component to hydroxyl groups in the polyol component is between 1.05:1 and 3.0:1 and preferably between 1.1:1 and 2.0:1. For optimal properties, this ratio is dependent on the type of composites to be produced and on air humidity and temperature. The mixture of the polyol and polyisocyanate component has only a limited storage life. A mixture prepared by intimate mixing of the reactants is generally processable for 0.25 to 12 hours at 20° C./50% relative air humidity, depending on the reactants selected and the stoichiometric mixing ratios. Continuous, machine-controlled mixing of the two reactants shortly before application to the film is preferred. Depending on their viscosity, the reactants are mixed at elevated temperature to obtain readily processable viscosities. Processing temperatures of up to 100° C. are possible, processing temperatures of up to 80° C. being preferred and those in the range from 20° to 50° C. being particularly preferred.

The solventless application of the adhesive mixture is carried out by a combination of application, lamination and winding systems, such as for example a "VARICOATER LF" plant of the type manufactured by Windmoller und Holscher, lengerich, or a "POLYTEST 440" LF laminating plant of the type manufactured by Polytype of Freiburg, Switzerland. The adhesives according to the invention may also be used as one-component systems.

For further particulars of the production of composite films, see also DE-A 2,549,227 or H. Hinsken in Kunststoff 77, 461 (1987). The adhesive is applied in a quantity of approximately 0.8 to 8.0 g/m² and preferably in a quantity of 1.0 to 4.0 g/m² depending on the method of application, the type of films involved and the conditions, such as for example printing inks.

One-component adhesives may even be applied in quantities of up to 20 g/m² adhesive.

The mixture may contain adhesive auxiliaries and/or additives, including for example reaction accelerators, such as for example tin(IV) compounds, or tertiary amines, fillers, plasticizers or lubricants and pigments.

Stabilizers, light stabilizers and moisture adsorbents known to the expert may also be added. To improve certain adhesive properties, coupling agents, such as silanes, may also be added to the adhesive.

The following are particularly preferred starting compounds:

Polyols

P-1

Polypropylene ether glycol having a molecular weight of 1,000
Hydroxyl value 112

P-2

Polypropylene ether glycol having a molecular weight of 2,000
Hydroxyl value 56

P-3

Polypropylene ether triol having a molecular weight of 450
Hydroxyl value 375

P-4

Polyethylene ether triol having a molecular weight of 300
Hydroxyl value 560

P5

Hydroxypolyester of adipic acid and neopentyl glycol having a molecular weight of 1,000
Hydroxyl value 110, acid value 0.7

P-6

Hydroxylpolyester of 1 mol P-1, 2 mol diethylene glycol, 1.2 mol orthophthalic acid and 0.8 mol isophthalic acid; molecular weight 1,400
Hydroxyl value 80, acid value 0.6

P-7

Hydroxyl polyester of 1 mol P-1, 2 mol ethylene glycol and 2 mol orthophthalic acid; molecular weight 1,400
Hydroxyl value 80, acid value 0.8

P-8

Reaction product of 1 mol P-6 with 0.3 mol I-1
Hydroxyl value 50

Polyisocyanates

I-1

2,4-Tolylene diisocyanate

I-2

Diphenyl methane diisocyanate containing more than 96% of the 4,4'-isomer

I-3

1-Isocyanatomethyl-3-isocyanato-1,5,5-trimethylcyclohexane (IPDI)

I-4

Hexamethylene diisocyanate

I-5

Reaction product of trimethylol propane with 3 mol I-1
NCO content: 17.2%

I-6

Reaction product of 1 mol polyol P-6 with 2.75 mol polyisocyanate I-2
NCO content: 9.9%

I-7

Trimer of I-1
NCO content: 22.5%

I-8

Trimer of 1-4
NCO content: 23.1%

I-9

4-Isocyanatophenyl-4-methyl-3-isocyanatocyclohexyl methane

I-10

4,4′Diisocyanatodicyclohexyl methane

I-11

4-Methyl-3,4′-diisocyanatodiphenyl methane

I-12

Reaction product of 1 mol P-6 with 4 mol polyisocyanate I-1, the monomeric I-1 subsequently being distilled off in a falling film evaporator
NCO content: 5.2%; <0.03% free TDI Production of the Polyols Containing Urea Groups y1 mol polyol (Y1) and z mol water (Z) are added to 1 mol polyisocyanate (X) at a temperature of 90° C. When the calculated quantity of carbon dioxide has been given off, y2 mol polyol (Y2) are added and the polyol is freed from the isocyanate by increasing the temperature. The polyol was degassed by application of vacuum.

| | X | Y1 | Z | Y2 | OHZ | Viscosity η50° C. (mPa·S) | Urea (%) |
|---|---|---|---|---|---|---|---|
| Pol-1 | I-1 | 0.5 P-1 | 0.2 | 1.0 P-1 | 50.6 | 3,000 | 0.7 |
| Pol-2 | I-1 | 0.3 P-1 | 0.4 | 1.0 P-1 | 56.0 | 9,600 | 1.6 |
| Pol-3 | I-3 | 0.5 P-1 | 0.2 | 1.0 P-1 | 52.3 | 1,500 | 0.7 |
| Pol-4 | I-3 | 0.3 P-1 | 0.4 | 1.0 P-1 | 58.1 | 3,000 | 1.6 |
| Pol-5 | I-1 | 0.5 P-6 | 0.2 | 1.0 P-6 | 34.5 | 16,000 | 0.5 |
| Pol-6 | I-1 | 0.3 P-6 | 0.4 | 1.0 P-6 | 43.7 | 15,000 | 1.2 |
| Pol-7 | I-3 | 0.5 P-6 | 0.2 | 1.0 P-6 | 36.9 | 9,000 | 1.1 |
| Pol-8 | I-3 | 0.3 P-6 | 0.4 | 1.0 P-6 | 39.5 | 12,000 | 1.1 |
| Pol-9 | I-3 | 0.15 P-6 | 0.4 | 1.15 P-6 | 44.8 | 10,000 | 1.1 |
| Pol-10 | I-9 | 0.5 P-6 | 0.2 | 1.0 P-6 | 36.6 | 26,000 | 0.5 |
| Pol-11 | I-10 | 0.3 P-6 | 0.4 | 1.0 P-6 | 42.4 | 27,000 | 1.2 |
| Pol-12 | I-11 | 0.3 P-6 | 0.4 | 1.0 P-6 | 39.6 | 40,000 | 1.2 |
| Pol-13 | I-1 | 0.3 P-6 | 0.4 | 1.0 P-1 | 58.9 | 20,000 | 1.5 |
| Pol-14 | I-3 | 0.04 P-6 | 0.5 | 0.9 P-6 | 36.6 | 38,000 | 2.0 |
| Pol-15 | I-1 | 0.05 P-7 | 0.4 | 1.25 P-7 | 42.1 | 8,000 | 1.2 |
| Pol-16 | I-3 | 0.04 P-6 | 0.5 | 0.96 P-1 | 50.9 | 9,000 | 2.3 |
| Pol-17 | I-1 | 0.05 P-6 | 0.4 | 0.48 P-1 | 32.0 | 5,000 | 1.3 |

| X | Y1 | Z | Y2 | OHZ | Viscosity η50° C. (mPa·S) | Urea (%) |
|---|---|---|---|---|---|---|
| | | | 0.48 P-2 | | | |

Production of the Urea-Containing Isocyanate Prepolymers (Particularly Preferred Embodiment)

y mol polyisocyanate (Y) are added to 1 mol polyol (X) at 60° to 90° C. and the reaction is continued until a constant NCO value has been reached. z mol water (Z) are then added and the progress of the reaction is monitored by a gas meter. The reaction mixture is degassed in vacuo before packing in the container.

| | X | Y | Z | % NCO | Viscosity η70° C. (mPa·s) | Urea |
|---|---|---|---|---|---|---|
| Iso-1 | P-6 | 2.5 I-1 | 0.4 | 4.74 | 22,000 | 1.2 |
| Iso-2 | P-6 | 2.5 I-1 | 0.48 | 3.98 | 34,000 | 1.57 |
| Iso-3 | 0.5 P-1 0.5 P-2 | 2.5 I-1 | 0.45 | 4.38 | 44,000 (at 21° C.) | 1.35 |
| Iso-4 | P-5 | 2.5 I-1 | 0.33 | 6.36 | 12,000 | 1.34 |
| Iso-5 | P-1 | 1.9 I-1 | 0.15 | 4.35 | 6,000 (at 50° C.) | 0.65 |
| Iso-6 | P-6 | 2.5 I-11 | 0.48 | 3.80 | 42,000 | 1.37 |

Viscosity was determined at the temperatures indicated using a Haake Viskotester VT 180 (spindle E 30, E100, E1000).

Examples

Production of the Adhesives

The polyol components are, if necessary, intensively mixed (the mixtures are indefinitely storable) and mixed at 40° C. with the polyisocyanate component, which—if it is a mixture—may also be stored in the form of a mixture, and the resulting mixture is immediately processed. The index (1) is understood to be the ratio of isocyanate groups to hydroxyl groups.

| | Polyol component (g) | Polyisocyanate component I (g) | |
|---|---|---|---|
| M-1 | 47.3 Pol-5 + 4.7 P-4 | 100 I-12 | 1.5 |
| M-2 | 45.1 Pol-6 + 4.5 P-4 | 100 I-12 | 1.5 |
| M-3 | 42.1 P-8 + 4.2 P-4 | 100 I-12 | 1.5 |
| M-4 | 100 P-3 | 844 Iso-2 | 1.2 |
| M-5 | 100 P-3 | 654 I-12 | 1.2 |
| M-6 | 100 P-3 | 596 Iso-2 + 99 I-6 | 1.2 |
| M-7 | 28.2 P-8 + 2.8 P-4 | 100 Iso-2 | 1.75 |
| M-8 | 30.0 Pol-6 + 3 P-4 | 100 Iso-2 | 1.75 |
| M-9 | — | Iso-2 | |
| M-10 | | I-12 | |

Mixtures M-3, M-5 and M-10 do not correspond to the invention; M-9 ad M-10 are one-component systems, the others are two-component systems.

Selection of the films and film composites mentioned in the Examples, and the explanation of the abbreviations are as follows:

Alu: aluminum foil, 40μ, shiny side is laminated
PA: polyamide film, stretched, 50μ
PE: polyethylene, 50μ, lubricant-containing, corona-treated
HD: sterilization-proof polyethylene, 70μ, corona-treated
PETP: polyester film, 75μ
PA/PE = composite 1

Alu/HD=composite 3
PA/HD=composite 4
Alu/PETP=composite 5
Quantity of adhesive applied: 2 to 3 g per m2.

The test specimens were selected from at least 20 m long laminates having a web width of 30 to 100 cm wound around a tube. The test specimens are cut out from the middle of the composite web after 5 laps have been unwound.

The bond strength tests were carried out 24 hours, 48 hours and 1 week after production of the films. From the time of their production, the films are stored in a conditioned room at 23° C./50% relative air humidity. In addition, composites 3 and 4 were subjected to a sterilization test in a Webeco counter-pressure autoclave for 30 minutes at 121° C. after storage for 1 week.

Test Procedure 15 mm wide strips of the laminates are cut with parallel edges to a length of 30 cm using an impact cutter. The bond is tested by the T-peel test using a VNGG testing machine of the type manufactured by Brugger GmbH, 8000 Munchen, in accordance with DIN 53 530, paragraph 7, at a crosshead speed of 100 mm/minute and with a test length of at least 100 mm.

The mean separation force is evaluated in accordance with DIN 53 289, paragraph 9.

The results are expressed in newtons/15 mm and are all the average values of double measurements.

|  | Composite 24 h/48 h/7d | Composite 3 24 h/48 h/7d/ster. | Composite 4 24 h/48 h/7d/ster. | Composite 5 24 h/48 h/7d |
|---|---|---|---|---|
| M-1 | 1.9/9.0/14.8A | 0.8/4.4/8.9/5.2 | 1.2/8.1/18.6A/12.1 | 0.8/5.0/9.8 |
| M-2 | 0.7/4.9/12.8 | /6.7 | /9.6 | 0.3/3.3/8.4 |
| M-3 | 0.2/1.9/10.0 | /4.2 | /7.5 | 0.2/0.6/7.7 |
| M-4 | 1.9/9.0/14.8A | 0.8/4.4/8.9/5.2 | /12.1A |  |
| M-5 | 1.4/6.0/8.4 | 0.2/0.6/0.5/0.2 | /6.0 |  |
| M-6 | 2.4/—/5.1 | 1.0/4.8/9.5/3.5 | 1.6/6.1/13.6A/7.0 | 1.2/5.9/9.4 |
| M-7 | 1.9/4.4/9.7A | 0.3/3.7/3.8/9.0 | 0.4/2.8/12.5A/7.0 |  |
| M-8 | 0.5/2.3/9.9A | 0.2/1.7/3.0/2.4 | 0.2/1.8/9/0/7.1 |  |
| M-9 |  | 0.2/0.6/7.4 | 0.2/0.8/8.4A |  |
| M-10 |  | 0.2/0.2/3.1 | 0.2/0.4/4.2 |  |

Examples M-3, M-5 and M-10 do not correspond to the invention.
Ster: strength after sterilization for 30 minutes at 121° C.
A: film tears The Tables show the following improvements over the comparison materials M-3, M-5 and M-10.

Mixtures 1-3

Mixtures 1 and 2 containing urea groups are distinguished by greatly increased initial strength (1 and 2 day values) for comparable ultimate strength.

Mixtures 4 and 5

Show greatly improved adhesion to aluminum/plastic composites (composite 3).

Mixtures 6 to 8

Show the generally high strength level of the adhesives according to the invention.

Mixtures 9 and 10

Show the better strengths of the urea-containing systems.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A transparent adhesive containing isocyanate groups based on at least one polyol and at least one polyisocyanate, characterized in that the adhesive contains a urea group corresponding to the following formula

X—R—NH—CO—NH—R'—Y in which
X and Y may be the same or different and represent NCO and/or —Z—CO—NH—, X and Y being attached to R and R' via the N atom of the NH group,
Z represents O, S, NH,
R and R' may be the same or different and represent the residue of a polyisocyanate containing at least two NCO groups of different reactivity after removal of the two NCO groups.

2. An adhesive as claimed in claim 1, characterized in that the polyol is a polyester, polyether or polyether ester.

3. An adhesive as claimed in claim 1, characterized in that the adhesive contains 0.15 to 4.0% by weight —NH—CO—NH— groups based on the adhesive.

4. An adhesive as claimed in claim 3, characterized in that the adhesive contains 0.3 to 3.0% by weight —NH—CO—NH— groups based on the adhesive.

5. An adhesive as claimed in claim 1, characterized in that R and R' represent an aryl, alkyl, cycloalkyl or aralkyl radical which may be substituted or unsubstituted.

6. An adhesive as claimed in claim 1, characterized in that X and Y represent isocyanate and/or urethane groups.

7. An adhesive as claimed in claim 1, characterized in that the polyol contains a urea group and is combined with polyisocyanates in a two-component reaction.

8. An adhesive as claimed in claim 1, characterized in that a polyol containing urea group and a polyisocyanate containing urea group are combined in a two-component reaction.

9. An adhesive as claimed in claim 1, characterized in that a polyisocyanate containing a urea group is a one-component adhesive.

10. A process for producing a composite film comprising applying an adhesive as claimed in claim 1 to the surface of a film and contacting it with another film.

* * * * *